US010666548B2

(12) United States Patent
Bernardi et al.

(10) Patent No.: US 10,666,548 B2
(45) Date of Patent: May 26, 2020

(54) METHOD FOR INTELLIGENT MULTI-HOP OVERLAY ROUTING

(71) Applicant: Extreme Networks, Inc., San Jose, CA (US)

(72) Inventors: Giacomo Bernardi, London (GB); Markus Nispel, Boston, MA (US)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 16/126,855

(22) Filed: Sep. 10, 2018

(65) Prior Publication Data

US 2020/0084137 A1  Mar. 12, 2020

(51) Int. Cl.
*H04L 12/721* (2013.01)
*H04L 12/707* (2013.01)
*H04L 12/26* (2006.01)

(52) U.S. Cl.
CPC ........ *H04L 45/124* (2013.01); *H04L 43/0852* (2013.01); *H04L 43/0888* (2013.01); *H04L 43/12* (2013.01); *H04L 45/22* (2013.01); *H04L 45/24* (2013.01); *H04L 45/26* (2013.01)

(58) Field of Classification Search
CPC .......... H04J 11/00; G06N 7/005; H04L 27/28; H04B 7/216; H04W 76/02
See application file for complete search history.

(56) References Cited

U.S. PATENT DOCUMENTS

| 7,082,473 B2 | 7/2006 | Breitbart et al. | |
| 2015/0139208 A1* | 5/2015 | Chan | H04L 47/00 370/338 |
| 2016/0352362 A1* | 12/2016 | Fonseka | H03M 13/2906 |
| 2019/0103993 A1* | 4/2019 | Cidon | H04L 45/123 |

FOREIGN PATENT DOCUMENTS

| CN | 106535276 A | 3/2017 |
| EP | 0660569 A1 | 6/1995 |

OTHER PUBLICATIONS

Auer et al, "The Nonstochastic Multiarmed Bandit Problem", *SIAM J. Comput.*, vol. 32, No. 1, pp. 48-77.
Ayesta et al., "PANACEA Proactive Autonomic Management of Cloud Resources", D2.3: Autonomic Communication Overlay, Grant Agreement No. 610764, Instrument: Collaborative Project Call Identifier: FP7-ICT-2013-10, date unknown, 53 pages.
(Continued)

*Primary Examiner* — Iqbal Zaidi
(74) *Attorney, Agent, or Firm* — Sterne, Kessler, Goldstein & Fox P.L.L.C.

(57) ABSTRACT

Systems and methods are presented herewith for selecting a preferred route for routing a packet from a first network node to a second network node. A set of possible routes is maintained, with each route having am associated weight value. A random subset of routes is then selected based on the weight values. Each route of the subset is then probed to determine its gain value. The preferred route is selected based on the gain values (e.g., by selecting the highest gain value). Then, all weight values are updated based on the respective gain values. The steps are periodically repeated. Then, whenever a packet needs to be routed, the route currently designated as preferred is used.

19 Claims, 6 Drawing Sheets

(56) References Cited

OTHER PUBLICATIONS

Brun et al., "Big Data for Autonomic Intercontinental Overlays", *HAL archives-ouvertes.fr*, HAL Id: hal-01461990, https://hal.laas.fr/hal-01461990, Feb. 8, 2017, 12 pages.

Brun et al., "Data Driven Self-Managing Routing in Intercontinental Overlay Networks", IEEE, date unknown, 9 pages.

Brun et al., "Scalable, Self-Healing, and Self-Optimizing Routing Overlays", HAL archives-ouvertes.fr, Hal Id: hal-01239559, https://hal.archives-ouvertes.fr/hal-01239559, Dec. 7, 2015, 27 pages.

Brun et al., "Shortest Path Discovery Problem, Revisited (Query Ratio, Upper and Lower Bounds)", HAL archives-ouvertes.fr, HAL Id: hal-01076628, https://hal-archives-ouvertes.fr/hal-01076628, Oct. 22, 2014, 17 pages.

Cesa-Bianchi et al., Prediction, Learning, and Games, Cambridge University Press, 2006, 403 pages.

D2.3: Autonomic Communication Overlay, Panacea Proactive Autonomic Management of Cloud Resources, Grant Agreement No. 610764, Instrument: Collaborative Project Call Identifier: FP7-ICT-2013-10, date unknown, 53 pages.

Francois et al., "Optimizing Secure SDN-enabled Inter-Data Centre Overlay Networks through Cognitive Routing," IEEE Computer Society, 24th International Symposium on Modeling, Analysis and Simulation of Computer and Telecommunications Systems, 2016, 6 pages.

Francois et al., "Towards a Cognitive Routing Engine for Software Defined Networks", Department of Electrical and Electronic Engineering, Imperial College, London, ArXiv:1602.00487v1 [cs.NI] Feb. 1, 2016, 7 pages.

Gelenbe et al., "Autonomous Smart Routing for Network QoS", IEEE Computer Society, Proceedings of the International Conference on Autonomic Computing (ICAC'04), 2004, 8 pages.

Gelenbe, "Cognitive Packet Network for Bilateral Asymmetric Connections," IEEE Transactions on Industrial Informatics, vol. 10, No. 3, Aug. 2014, 9 pages.

Gelenbe et al., "Cognitive Packet Network for QoS Adaptation of Asymmetric Connections", IEEE WCNC, Workshop on Self-Organizing Networks, 2014, 6 pages.

Gelenbe et al., "Cognitive Packet Networks: QoS and Performance", School of Electrical Engineering and Computer Science, University of Central Florida, date unknown, 7 pages.

Gellman, QoS Routing for Real-Time Traffic, Department of Electrical and Electronic Engineering, Imperial College London, Feb. 26, 2007, 137 pages.

György et al., "The On-Line Shortest Path Problem Under Partial Monitoring", Journal of Machine Learning Research 8, Submitted Apr. 2007; Revised Aug. 2007; Published Oct. 2007, 35 pages.

International Search Report and Written Opinion directed to related International Patent Application No. PCT/US/2019/50217, dated Nov. 18, 2019; 6 pages.

* cited by examiner

METHOD FOR INTELLIGENT MULTI-HOP OVERLAY ROUTING

BACKGROUND

Network devices (or network nodes) connected by a software-defined networking in a wide area network (SD-WAN) are often unable to identify an optimal path for routing a packet from one network node to another. Usually, a route with the shortest number of hops (i.e. a route that will traverse the smallest number of network nodes) is selected. However, often, the route that will traverse the smallest number of nodes is not a route that has the least latency or the largest bandwidth. For example, the latency can be affected by a blackout or brown at some point in the network. In such situations routing based on shortest number of hops is highly inefficient.

SUMMARY

Accordingly, there is a need for a technique of selecting a preferred (e.g., the best) route for a packet based on the actual conditions of the network. In some embodiments, a routing system may attempt to keep an up-to-date table of latency and bandwidth for each possible route. However, probing all routes at all times is time-intensive and a computationally-demanding task that may be challenging and time consuming to perform in a large network. In some embodiments, only a subset of all routes may be probed. For example, each route may have an associated weight value. Periodically, a subset of all routes may be selected to be actively probed. The selection may be randomized, but the routes with higher weight values may be selected more often. The selected routes are then probed for latency, and the weights are updated based on the results of the probing. At any time, the route currently known to have the smallest latency is used to route a packet. In this way, a preferred (e.g., best) route may be identified without the need to probe all routes.

The subject matter described herein includes methods, systems, and computer readable media for selecting an optimized route for a packet that is to be routed from a first network node to a second network node in a network. In some embodiments, each network node may maintain a set of possible routes from the first network node to the second network node. For example, each route may define an order of other network nodes that the packet will be routed through in a multi-hop fashion. In some embodiments, each route may have an associated weight. For example, the preferred (e.g., best) route and its associated weight may be stored as an ordered pair. In some embodiments, the network node may select a subset of routes to be probed and in some cases the subset may include some routes that are randomly selected, but where the random selection is influenced or biased by the weight values. In some embodiments, the subset may be significantly smaller than the full set of routes.

Each of the routes in the subset may then be actively probed for latency or for bandwidth and the preferred (e.g., best) route may be selected based on the determined values of the probed routes. Some (or all) weights may then be updated based on the latency values or bandwidth values. The aforementioned steps may be repeated periodically. In some embodiments, whenever the node receives a request to route a packet to a destination node, the network node may route the packet via the route that is currently designated as the preferred (e.g., best) route. Because this technique does not require continuous probing of a large number of routes (e.g., all routes), significant computation and network bandwidth savings are achieved. In particular, the aforementioned method is advantageous over conventional methods because the preferred (e.g., best) route is calculated with significantly less expense than would be involved in actively probing all possible routes.

In some embodiments, a network node may be a router, a switch, a server, a virtual router, any other combination of hardware and software capable of performing networking functions, or any combination thereof. In some embodiments, network nodes are connected via point-to-point or multiple-access network links. In some embodiments, control circuitry built into a network node may perform the actions required by the process.

In some embodiments, the control circuitry may maintain a set of possible routes from the first network node to the second network node, wherein each possible route has an associated weight value. For example, each route may define an order of other network nodes through which the packet may be routed, and have an associated numerical weight value. The control circuitry may then randomly select a subset of routes from the set of possible routes and sometimes, the subset may include substantially less routes than the full set.

In some embodiments, the random selection may be influenced by the respective associated weight value of each possible route. For example, a route with a weight value of "10" may be twice as likely to be selected as a route with a weight value of "5." In some embodiments, the subset of routes may also include last used route from the first network node to the second network node and an Internet Protocol (IP) route (i.e. a route selected by IP routing algorithm) from the first network node to the second network.

In some embodiments, the control circuitry (e.g., control circuitry of the first network node) may probe each route from the subset of routes to determine a gain value for each probed route. For example, a probe packet may be sent along the route to gather data necessary for the gain calculation. The control circuitry may then designate the route from the subset of routes with the highest gain value as the preferred (e.g., best) route. The highest gain value may be determined by comparing the gain values with each other.

In some embodiments, the control circuitry may update each weight value associated with each respective probed route based on the respective determined gain value.

In some embodiments, the steps of randomly selecting a subset of routes, probing each route in the subset, selecting the preferred (e.g., best) route, and updating the weight value may be repeated periodically (e.g., every hour.)

At any time, the control circuitry may receive a request, at the first network node, to route the packet to the second network node. For example, a packet to be routed may be received from another network node or the packet to be routed may be generated by an application executing on the first network node. The control circuitry may in response to receiving the request, route the packet along the route designated, at the given time, as the preferred (e.g., best) route.

In some embodiments, the control circuitry may determine a gain value for a particular probed route from the subset of routes by sending a probe packet from the first network node to the second network node via the probed route that is being evaluated. After each hop along the route, each network node may append a timestamp to the probe packet. For example, the timestamp may include an identifier of the node and a time at which the packet was received at the respective network node. The control circuitry may then calculate a latency value based on each appended timestamps. For example, the time between hops may be summed to calculate the latency value. Then, the control circuitry may determine the gain value for a particular probed route based on the latency value. For example, the gain value may be set equal to the reciprocal value of the latency value.

In some embodiments, the control circuitry may probe each route from the subset of routes to determine a bandwidth value for each probed route. In some embodiments, this may be performed alongside or instead of probing each route for latency. In some embodiments, the control circuitry may designate a route of the subset of routes that has a highest bandwidth value as the preferred (e.g., best) route.

In some embodiments, the control circuitry may determine a bandwidth value for a particular probed route from the subset of routes using the following technique. In some embodiments, the control circuitry may send two packets back-to-back from the first network node to the second network node via the particular probed route. In some embodiments, the control circuitry of the second network node may calculate dispersion value by measuring the rate at which the first packet and second packet are received at the second network node. In some embodiments, the control circuitry may then calculate the bandwidth value based on the dispersion value. For example, Trains of Packet Pairs (TOPP) techniques may be used to perform this calculation.

In some embodiments, the control circuitry may route the packet along the preferred route by modifying the packet to include an overlay routing header. In some embodiments, the packet may be routed, by each network node along the route, based on the data of the overlay routing header. In some embodiments, the control circuitry may populate the overlay routing header to include an address for each hop of the preferred route. In some embodiments, each network node along the route will route the packet to the next node as specified by the overlay routing header.

In some embodiments, the control circuitry may perform initialization of the weights associated with the network nodes. In some embodiments, the control circuitry may initialize each associated weight value for each possible route based on the length of the respective route. In some embodiments, the control circuitry may then normalize all the weights with respect to each other.

In some embodiments, the control circuitry may update a weight value associated with a particular probed route by calculating a ratio by dividing the determined gain of the particular probed route by the weight value associated with the particular probed route. Then, the control circuitry may calculate an exponent of the ratio value and set the calculated exponent as the new weight value.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

A system and method that are describe herein are directed to improving an ability of a network node to route a packet along a preferred (e.g., best possible) route. As explained above, it is time consuming and challenging for a network node to actively probe all possible route to a second network node at all times. Instead, an intelligent iterative technique for selecting and probing only a subset of routes is provided. In practice, such technique is very likely to provide a preferred (e.g., he best possible) route with significantly reduced expenditure of resources needed to probe routes.

Each network node of a network may maintain a list of all routes to all other network nodes. In some embodiments, the first network node may maintain a list of routes to a second network node. Each route may have an associated weight value. Instead of constantly probing all possible routes, the first network node may only probe a smaller subset of routes randomly selected based on their weights. After each route is probed, the route with the lowest latency (or highest bandwidth) is chosen as a current preferred route. The highest gain value may be determined by comparing the gain values with each other. In some embodiments, the second highest value may be selected instead. The weights are then updated using the latency or bandwidth values. Whenever the first network node needs to route a packet to the second network node, the current preferred route is used.

The term "random selection" may refer to any kind of a selection that uses any kind of a true random or pseudorandom technique to select one object from a set of other objects. In some embodiments, the random selection technique may be influenced or weighted by non-random factors in addition to random or pseudorandom factors. That is, in some embodiments, not every object will have an equal chance of being selected by the random technique. For example, when selecting from a set {A,B}, the object A may be selected with 1/3 probability, while the object B may be selected with 2/3 probability.

Figure 1:
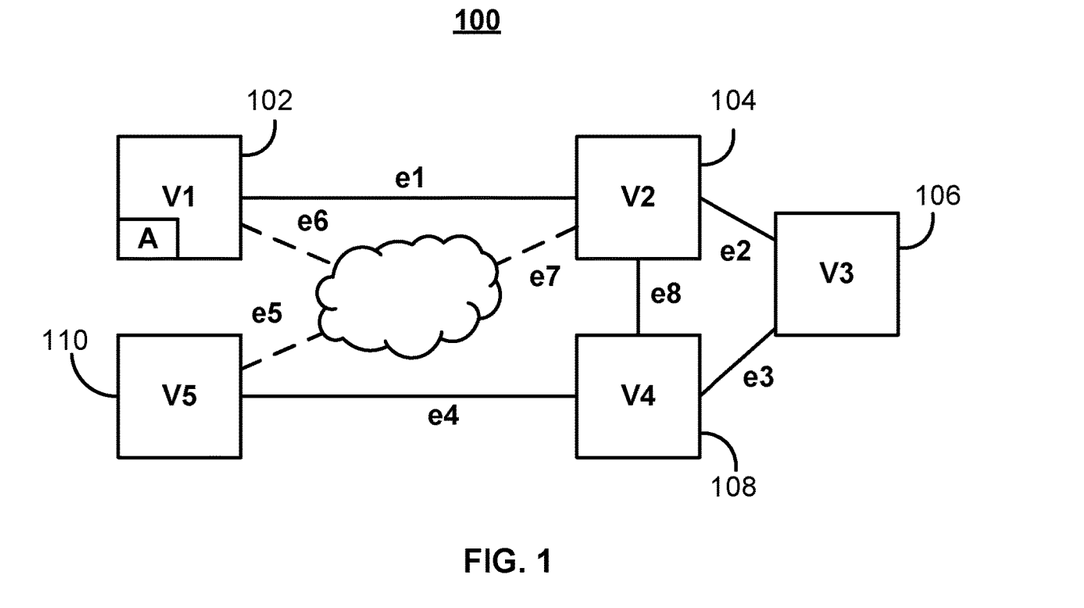
FIG. 1 depicts block diagram illustrating an exemplary network having several network nodes, in accordance with some embodiments of the disclosure.

FIG. 1 depicts block diagram illustrating an exemplary network 100 having several network nodes, in accordance with some embodiments of the disclosure. In some embodiments, network 100 may include network nodes 102, 104, 106, 108, and 110 connected by links e1-e8. In some embodiments, each network node may include control circuitry for data processing, storage circuitry for storing data, and communication circuitry suitable, at least, for routing packets. In some embodiments, links e1-e8 may be hardware network links or abstracted network links implemented over any kind of hardware. In some embodiments, any of the links e1-e8 may be a wired link, a wireless link, a virtual link over the public Internet, or any combination thereof.

In some embodiments, network 100 may be a software defined wide area network (SD-WAN) operating on top of a public network (e.g., the Internet). Some links of network 100 may be point-to-point links. For example, node 102 may be connected to node 104 via a single point-to-point link e1. In another example, node 102 may be connected to nodes 104 and 110 via point-to-multipoint link e6.

Each network node of network nodes 102-100 may run a set of applications. In some embodiments, each application may be characterized by a requirements vector, which indicates the minimum acceptable performance level that the network path must respect in order to be valid. For example, network node 102 may include a set of applications A. In this example, the set of applications A may include an application $a_1$ that has the following requirements: latency <10, packet loss <0.1, and bandwidth=30.

In some embodiments, each link e1-e8 may carry a performance vector which may define the characteristics relevant to an application of the set of applications A (e.g., latency, packet loss, bandwidth.)

Each time any of the network node 102-110 needs to route a packet to any other network node, it will have to select a possible route. In some embodiments, the route selection will be constrained characteristics of an application A that generated the packet. For example, some packets will need to be routed with a certain latency constraint or bandwidth constraints. Embodiments, describe above and below provide improved techniques for such route selection.

Figure 2:
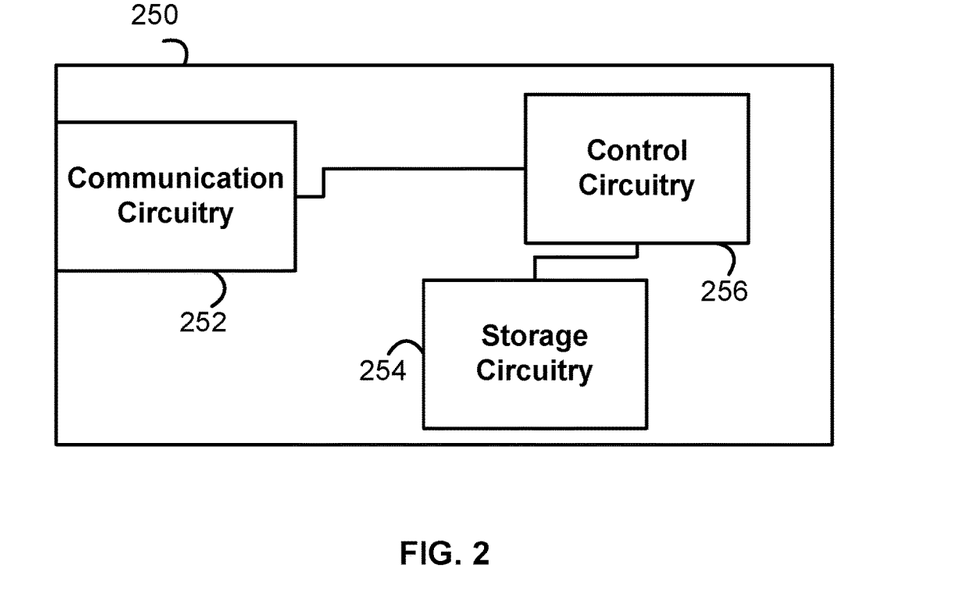
FIG. 2 depicts block diagram illustrating an exemplary network node, in accordance with some embodiments of the disclosure.

FIG. 2 depicts a block diagram illustrating an exemplary network node 250, in accordance with some embodiments of the disclosure. In some embodiments, network node 250 may correspond to any one of the network nodes 102, 104, 106, 108, and 110.

In some embodiments, network node 250 may be a router, a hub, a switch, a server, any other device capable of receiving or transmitting network packets, or any combination thereof. In some embodiments, Network node 250 may include communication circuitry 252, storage circuitry 254, and control circuitry 256. In some embodiments, communication circuitry 252 may be any known receiver, transmitter, transceiver, or any other known means of transmitting and/or receiving data (e.g., data packets). In some embodiments, communication circuitry 252 may be capable of communicating data over IP networks, WAN networks, virtual network, SD-WAN networks, any other digital or analog network, or any combination thereof. Storage circuitry 254 may be any computer readable media capable of storing data. Such computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc. Control circuitry 256 may be based on any suitable processing circuitry, such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer.

Figure 3A:
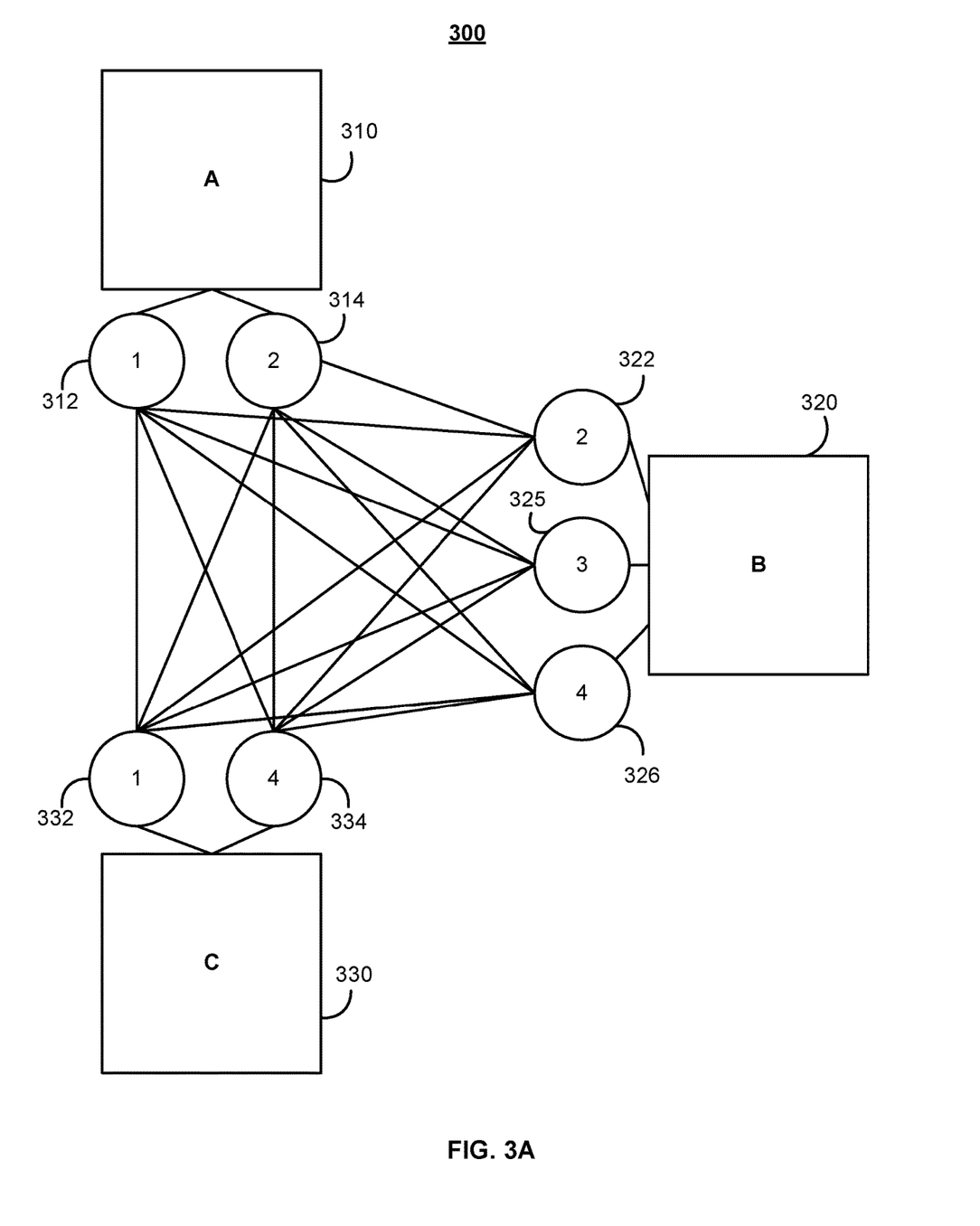
FIG. 3A depicts block diagram of an exemplary network having several network nodes with a first set of available routes, in accordance with some embodiments of the disclosure.

FIG. 3A depicts block diagram of an exemplary network 300 having several network nodes with a first set of available routes, in accordance with some embodiments of the disclosure. In some embodiments, network 300 may include network nodes 310, 320, and 330. In some embodiments, any of network nodes 310, 320, and 330 may correspond to one of nodes 102-110 of FIG. 1. In some embodiments, any of network nodes 310, 320, and 330 may be implemented as a network node 250 of FIG. 2.

In some embodiments, network 300 may include subnetworks provided by any number (e.g., four) of Internet Service Provider (ISPs) 312, 314, 325, and 326. For example, network node 310 may be able to communicate via subnetwork of the first ISP 312 and the subnetwork of the second ISP 314. In the depicted example, network node 320 may be able to communicate via subnetwork of the second ISP 322, the subnetwork of the third ISP 325, and the subnetwork of the fourth ISP 326. Further, in the depicted example, network node 330 may be able to communicate via subnetwork of the second ISP 332 and the subnetwork of the fourth ISP 334.

In some embodiments, each network node 310, 320, 330 may include control circuitry (e.g., control circuitry 256) for data processing, storage circuitry for storing data (e.g., storage circuitry 256), and communication circuitry (e.g., communication circuitry 252) suitable, at least, for routing packets. In some embodiments, each of the four ISP subnetworks may have a mix of peering and transit to the global Internet. In some embodiments, each of the four ISP subnetworks may include any kind of communicative links (e.g., links e1-e8 of FIG. 1).

In some embodiments, each of the network nodes 310, 320, and 330 may be able to create a large number of virtual private networking (VPN) connections for connecting to any other network node.

In some embodiments, if the ideal conditions prevail, traffic between network nodes may follow the route with smallest number of hops between network nodes and ISPs (i.e., a route with smallest number of intermediaries.) For example, all packets routed from network node 310 to node network node 320 may be routed via the subnetwork of the second ISP 314. For example, each packet may travel from network nodes 310 via connection 314, to connection 322 and finally to node 320. In some embodiments, each ISP 312, 314, 325, and 326 will generally keep packet traffic between two customers inside their subnetwork and will not route it through the global Internet.

Figure 3B:
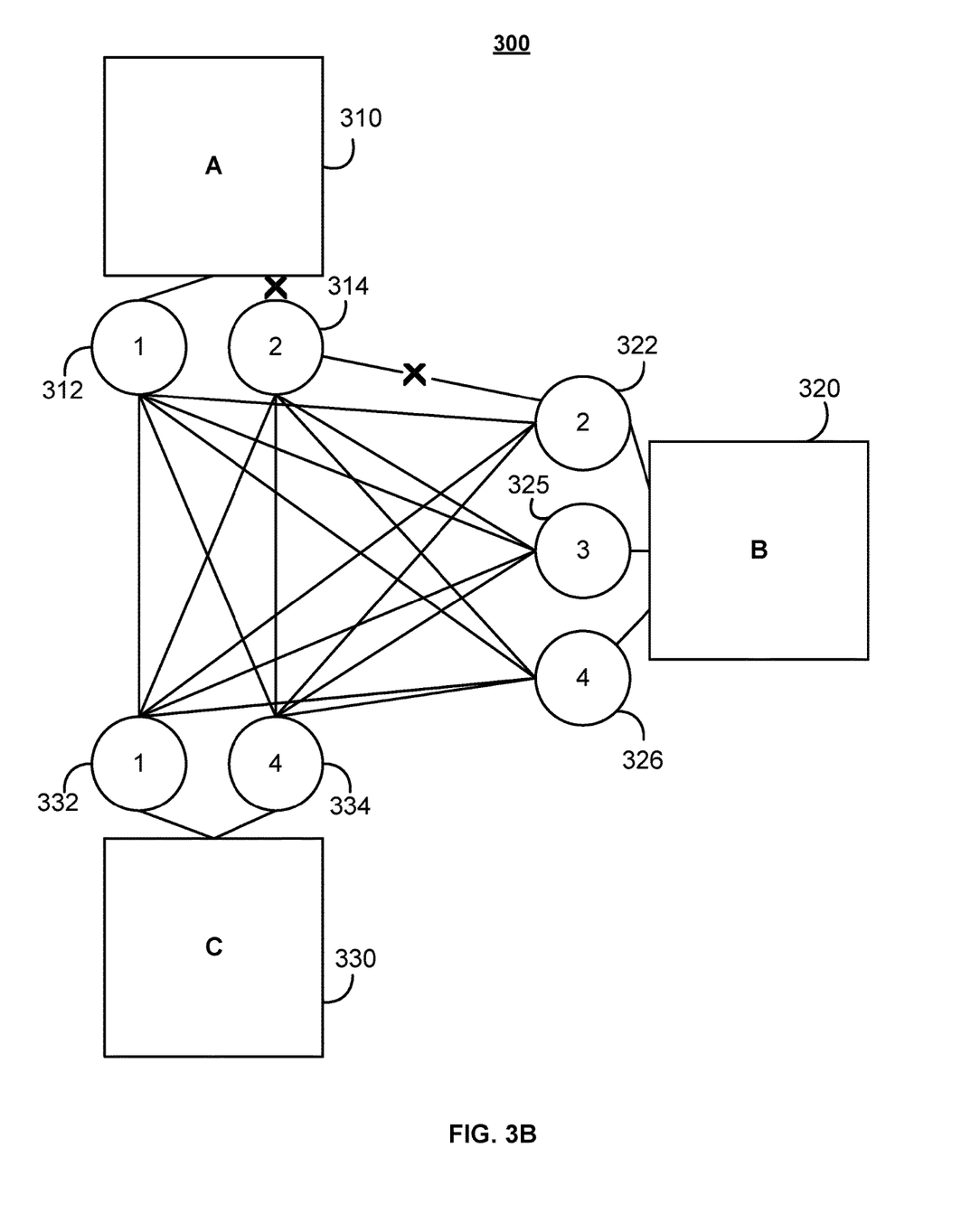
FIG. 3B depicts block diagram of an exemplary network having several network nodes with a second set of available routes, in accordance with some embodiments of the disclosure.

FIG. 3B depicts a block diagram of an exemplary network 300 having several network nodes with a second set of available routes, in accordance with some embodiments of the disclosure. In some embodiments, network 300 is the same network as depicted in FIG. 3A, while under effect of a blackout or a brownout.

In some embodiments, network node 310 may have experienced a loss of connection 314. In other words, network node 310 may not be able to access a subnetwork of the second ISP. For example, a route between network node 310 and connection 312 may be nonoperational or slowed. In another example, a route between connection 312 and connection 322 may be nonoperational or slowed.

In some embodiments, a packet from network node 312 may be routed to network node 320 in a different fashion. For example, packet may be routed from network node 320 via connection 312, to connection 332, to network node 330, to connection 334, to connection 326, and finally to node 320.

Accordingly, due to the possibility of such blackouts or brownouts, any route through network 300 may have time-varying characteristics (e.g., bandwidth, latency and packet loss).

In some embodiments, network 300 may use Border Gateway Protocol (BGP) routing to select a route for a packet from any of the network nodes 310, 320, and 330 to any other network nodes. However, conventional BGP preferred path selection criteria do not involve performance metrics. Instead, BGP routing algorithms select the shortest path expressed in terms of number of Autonomous Systems (e.g., network nodes and ISPs) that were crossed. However, as explained above, such a metric is a suboptimal proxy for actual latency or bandwidth.

In some embodiments, network 300 may include a routing overlay that can route packets between network nodes 310, 320, and 330 by multiple routes decoupled from the underlying IP routing. The overlay can make application specific routing decisions by forwarding packet traffic of specific applications on paths calculated on different set of metrics. For example, some packets may be routed on a route with the best gain (i.e. lowest latency), while some packets may be routed on a route with the best bandwidth.

In some embodiments, the overlay routing may be performed using the technique describe below. For example, in some situation network node 310 may need to route a packet network node 320 along the route with the smallest latency or the largest bandwidth (e.g., as specified by an application that generated that packet). In some embodiments, network node 320 may utilize the technique describe below to accomplish the selection of the preferred route.

In some embodiments, the control circuitry of network node 310 may maintain a set of routes to network node 320. In some embodiments, the data related to the set of routes may be stored on storage circuitry of network node 310.

In some embodiments, the set of routes may be represented as set $I\{i_1 \ldots i_X\}$ where every $i \in I$ is a specific route. For example, route $i_1$ may be a route from network node 310 via connection 314, to connection 322 and finally to network node 320. In another example, route $i_2$ may be a route from network node 320 via connection 312, to connection 332, to network node 330, to connection 334, to connection 326, and finally to network node 220.

In some embodiments, at a first time, each $i \in I$ may have an associated weight value $\{w_1 \ldots w_n\}$. In some embodiments, routes and associated weights may be stored as a table defining each route and each weight. For example, route and weights may be stored as an exemplary Table 1 depicted below.

TABLE 1

| Route | Route Details | Weight |
|---|---|---|
| $i_1$ | Node 310 -> Connection 314 -> Connection 322 -> Node 320 | $w_i = 10$ |
| $i_2$ | Node 310 -> Connection 312 -> Connection 325 -> Node 320 | $w_i = 5$ |
| $i_3$ | Node 310 -> Connection 312 -> Connection 332 -> Node 330 -> Connection 334 -> Connection 326 -> Node 320 | $w_i = 8$ |

In some embodiments, the control circuitry may initialize each weight value $W\{w_1 \ldots w_n\}$ using the following formula:

$$w_i = \frac{1}{e^{len(i)}}.$$

Where len(i) is the number of hops in the route i.

In some embodiments, the control circuitry may then normalize the weight values. For example, the weights may be normalized using the following formula $$w_i = \frac{w_i}{\sum_{j=1}^{X} w_j}.$$

In other words, each weight may be divided by the sum of all weights.

In some embodiments, at the first time the control circuitry may then select a subset $I_1\{i_1 \ldots i_N\}$ where N<X. That is, a smaller number of routes than the entire set is selected for the subset. In some embodiments, the subset may include the last used route from the network node 310 to the network node 320. In some embodiments, the subset may include an IP route (i.e. a route selected by IP routing algorithm) from the network node 310 to the network node 320. In some embodiments, the rest of the routes for the subset $I_1$ may be randomly selected from set I. In some embodiments, the random selection may be biased or influenced by respective weights from set W. For example, route $i_5$ with associated weight value $w_5=10$ may be twice as likely to be selected as route $i_7$ with associated weight value $w_7=5$.

In some embodiments, the control circuitry may then probe each route in the subset $I_1$. For example, one or more test packets may be sent along each route in the subset $I_1$ to determine latency for each $i \in I_1$. For example, set $\Lambda\{\lambda_1 \ldots \lambda_n\}$ may be computed where $\lambda_1$ represent latency value of route $i_1$, $\lambda_2$ represent latency value of route subset $i_2$ etc.

In some embodiments, set $\Lambda$ may be used to compute a set of values $G\{g_1 \ldots g_n\}$ by taking a reciprocal of each value of set $\Lambda$. For example, $$g_1 = \frac{1}{\lambda_1}, g_2 = \frac{1}{\lambda_2},$$

etc. In some embodiments, the route with the highest gain value may then be selected by the control circuitry as the preferred route. In some embodiments, the route with second highest or third highest gain value may then be selected by the control circuitry as the preferred route.

In some embodiments, the control circuitry may update the weights of routes that were in the subset $I_1$. For example, weight $w_1$ of route $i_1$ may be set as follows, $$w_1 = w_1 * e^{\frac{g_i}{w_i}}.$$

In some embodiments, at a second time (e.g., after 10 minutes have passed from the first time) the steps described above may be repeated. For example, the control circuitry may, at the second time, select a new subset of routes $I_2$ based on the updated weights and repeat the probing step, the gain computation step, the preferred route determination step, and the weight values update step.

In this way, whenever a packet needs to be routed from network node 310 to network node 320, the route that is currently designated as preferred may be used.

In some embodiments, each of the network nodes 310, 320, 330 may act independently to find the preferred routes for all routed packets using the techniques describe above. For example, each network nodes 310, 320, 330 may maintain a list of all the nodes in network 300 (e.g. each network node may be identified by a 32-bit ID) and a table of the IPv4/IPv6 endpoint addresses of all the other network nodes in network 300.

In some embodiments, the control circuitry of network node 310 may intercept and encapsulate each packet it routes into a particular message format. In some embodiments, the control circuitry may add a variable-length overlay routing header described below.

In some embodiments, the overlay routing header may be added within an authenticated and encrypted section of the protocol stack of a packet, just after the Encapsulating Security Payload (ESP) header and before the encapsulated original Internet Proctor (IP) header. The encapsulated packet may include a 4-bit field "Packet Type" that defines the type of the current packet as a payload-carrying packet.

In some embodiments, each encapsulated data packet may include additional fields as part of the overlay routing header, including:

(1) A 4-bit field with the number of hops in the current route. For example, in case of a direct path, this field may have a value "1".
(2) A 4-bit pointer to the ID of the next hop. The value in this field may starts from "1" and may be incremented at each hop.
(3) A 32-bit per-packet sequence number.
(4) A list of 32-bit node IDs for all intermediate hops and for the destination.

In some embodiments, the overlay routing header may thus describe exact route for routing the packet from network node 310 to network node 320, by listing the number of hops, the current hop, and the address of a network node to where the packet should be routed at each hop.

In some embodiments, the probing of latency of a path may be accomplished by transmission of a probe packet. For example, the control circuitry may send a probe packet via route $i_1$ to measure the latency value of that route. In some embodiments, a probe packet may include a 4-bit field "Packet Type" that defines the type of the current packet used as a probe packet to measure route latency.

In some embodiments, the probe packet may include node IDs for each network nodes along the route (e.g., along route $i_1$). In some embodiments, whenever each network node receives the probe packet, the control circuitry of that network node may add a current timestamp to the probe packet. In some embodiments, a time stamp will be added both during the forward path (e.g., from network node 310 to network node 320) and the return path (e.g., from network node 320 back to network node 310). In some embodiments, the latency of each segment can then be determined based on the timestamps. In some embodiments, the control circuitry may send small trains of consecutive probe packets in order to estimate the average latency and determine jitter (i.e., the latency standard deviation) and packet loss rate. In some embodiments, probe packets not returned before a hard-coded timeout are considered lost.

In some embodiments, each probe packet may include the following fields:

(1) Number of hops that defines the number of network nodes in the route, excluding the source network node. In case of a direct route, this field has value "1".
(2) A next hop pointer to the ID of next network node ID where the packet should be forwarded. This field may start from "1" and be incremented at each hop.
(3) Direction field that may be "0" for the forward path and "1" for the return path.
(4) Sequence number field that may be a 32-bit incremental counter for the current probe.
(5) A list of IDs of network nodes that act as intermediate hops to the destination network node.
(6) A list of 32-bit timestamps (e.g., UNIX timestamp in milliseconds) that are recorded by each network node at each hop along the route. This list may be initially filled with zeros.
(7) A probe packet may include padding that is appended to the packet in order to fill up all probe packets to a constant size. This may be needed because, otherwise, paths with a lower number of intermediate hops may results in smaller probe packets, potentially impacting measurements.

In some embodiments, the control circuitry may also measure bandwidth value for each route in the subset $I_1$. In some embodiments, bandwidth of path $i_1$ may be measured by sending two packets (e.g., from network node 310 to network node 320) in back-to-back manner. The dispersion experienced by the two packets may be used to measure the bandwidth.

In some embodiments, the bandwidth is measured using Trains of Packet Pairs (TOPP) algorithms. For example, the control circuitry may send many packet pairs at gradually increasing rates from the source (e.g., network node 310) to the sink (e.g. network node 320). In some embodiments, a packet pair is sent from the source with initial dispersion $\Delta_s$. In some embodiments, the probe packets may have a size of L bytes, and thus the offered rate of the packet pair may be $$R_0 = \frac{L}{\Delta_s}.$$

In some embodiments, if $R_0$ is more than the end-to-end available bandwidth A, the second probing packet will be queued behind the first probing packet, and the measured rate at the receiver will be $$R_m = \frac{L}{\Delta_t} < R_0.$$

In some embodiments, if $R_0 > A$ the control circuitry may assume that the packet pair will arrive at the receiver with the same rate it had at the sender, i.e., $R_m = R_0$. In some embodiments, the control circuitry may estimate the available bandwidth A to be the maximum offered rate such that $R_0$ is approximately equal to $R_m$.

Figure 4:
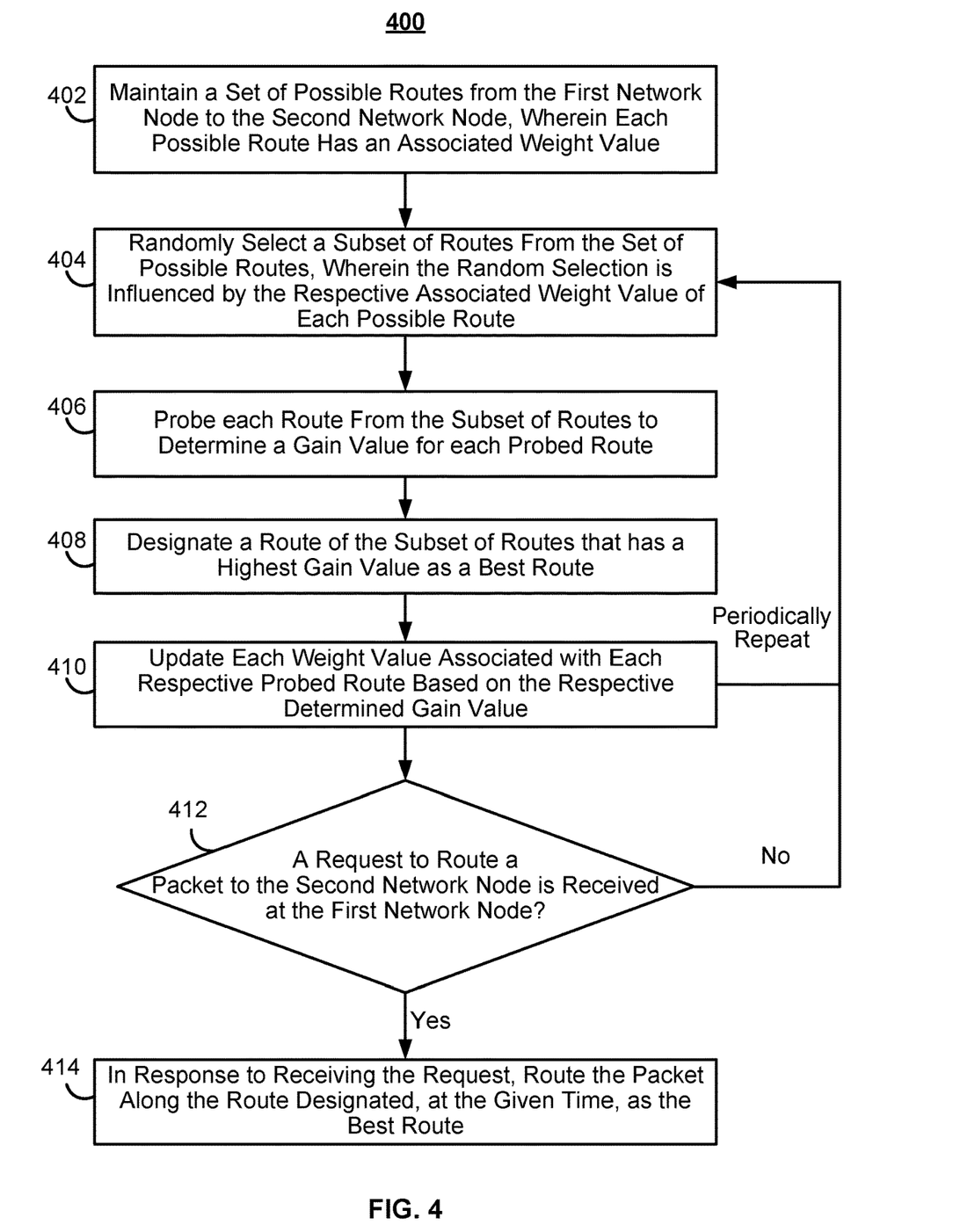
FIG. 4 depicts an illustrative flow chart of an exemplary process for routing a packet along an optimal route, in accordance with some embodiments of the disclosure.

FIG. 4 depicts an illustrative process 400 for routing a packet along an optimal route, in accordance with some embodiments of the disclosure. In some embodiments, process 400 may be performed by at least one node of network 100 or network 300. For example, in an illustrate example, process 400 may be performed by control circuitry 256 of a first network node (e.g., network node 310) to identify a preferred route to a second network node (e.g., network node 320). In some embodiments, process 400 may be performed by control circuitry of first network node (e.g., control circuitry 256). In some embodiments, some steps may be performed by control circuitries of other network nodes.

Process 400 begins at 402, where control circuitry 256 maintains a set of possible routes from the first network node to the second network node, wherein each possible route has an associated weight value. For example, a description of each route may be stored in memory of the first network node (e.g., storage circuitry 254). In some embodiments, each route may define an order of other network nodes along which a packet may be routed. In some embodiments, each route may include an associated weight value. In some embodiments, the weight value may be stored in the memory of the first network node (e.g., on storage circuitry 254).

In some embodiments, control circuitry 256 may initialize each associated weight value for each possible route based on the length of the respective route. For example, the initial weight value for each route may be set as a reciprocal of an exponent of the length of the route. In some embodiments, the weights may also be normalized against each other. For example, each weight may be adjusted by dividing that weight by the sum of all weights.

Process 400 continues at 404, where control circuitry 256 may select a subset of routes from the set of possible routes. In some embodiments, at least some of the routes may be selected for a subset in a randomized manner. In some embodiments, the randomized process may be influenced by the respective associated weight value of each possible route. For example, routes with a higher weight values may be more likely to be selected than routes with lower weight values. For example, a route with a weight value of "4" may be three times less likely to be selected that a route with a weight value of "12". In some embodiments, any other weighting or biasing based on the weight may be used.

In some embodiments, the subset may also include a last used route from the first network node to the second network node. For example, control circuitry 256 may store an indication of which route was last used and include that route into the subset. In some embodiments, the subset may also include an IP route from the first network node to the second network node. For example, control circuitry 256 may use conventional IP routing algorithms to identify the IP route, and include that route into the subset.

Process 400 continues at 406, where control circuitry 256 may probe each route from the subset of routes to determine a gain value for each probed route. In some embodiments, control circuitry 256 may actively probe each route from the subset of routes. For example, control circuitry 256 may send a probe packet to the second network node to measure latency of the route. In some embodiments, a respective gain value may be calculated as a reciprocal of each respective latency value.

In some embodiments, at 406, control circuitry 256 may, in addition to or instead of probing each route from the subset to determine a gain value, probe each route in the subset to determine a bandwidth value.

Process 400 continues at 408, where control circuitry 256 may designate a route of the subset of routes that has a highest gain value as a preferred route. For example, control circuitry 256 may store an indication (e.g., in storage circuitry 256) that always indicates which route is currently designated as the preferred route from the first network node to the second network node. In some embodiments, control circuitry 256 may designate a route of the subset of routes that has a highest bandwidth value as a preferred route.

Process 400 continues at 410, where control circuitry 256 may update each weight value associated with each respective probed route based on the respective determined gain value. For example, a new weight value for a particular route may be calculated as follows. Control circuitry 256 may calculate a ratio value by dividing the determined gain of the particular probed route by the current weight value associated with the particular probed route. Then, control circuitry 256 may calculate a natural exponent of the ratio value and then multiply the natural exponent value by the current value to determine the updated weight value. In some embodiments, control circuitry 256 may update the weight based on bandwidth values instead of gain values.

In some embodiments, control circuitry 256 may repeat some or all of steps 404-410 periodically. For example, steps 404-410 may be repeated every 10 minutes, every hour, or at any other rate.

In some embodiments, steps 412-414 may be performed at any given time (e.g., at any point between or after steps 404-410) when control circuitry 256 receives a request to route the packet to the second network node.

At 412, control circuitry 256 may determine that request to route the packet to the second network node is receive. In some embodiments, the request may be received from another node. In some embodiments, the request may be generated by an application executing on control circuitry 256. In some embodiments, if the request is received, process 400 may continue at step 414, otherwise process 400 may return to step 404 and continue cycling through steps 404-410.

At 414, control circuitry 256 may, in response to receiving the request, route the packet along the route designated, at the given time, as the preferred route. For example, control circuitry 256 may check which route is currently indicated as the preferred route, and route the packet along that route.

Figure 5:
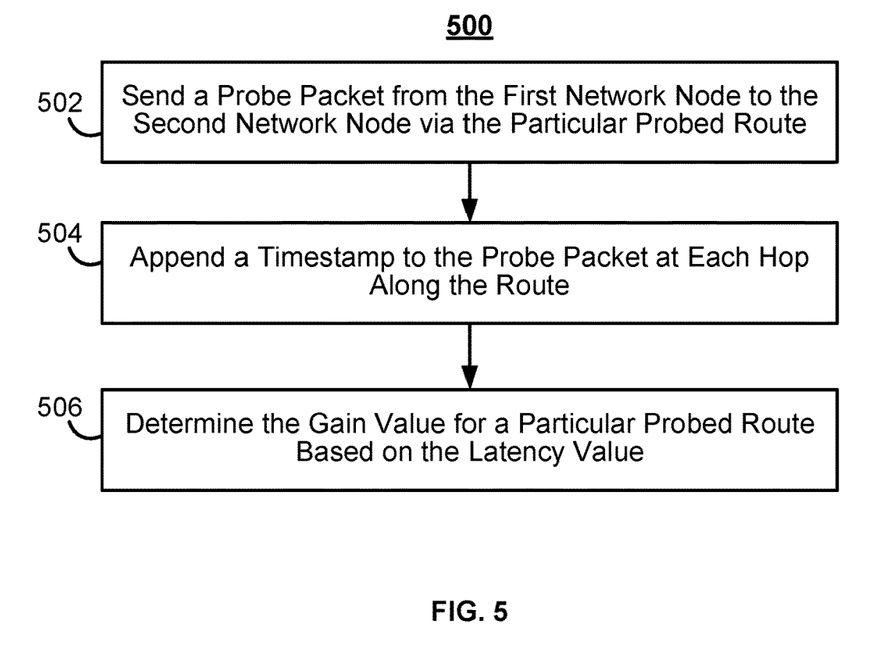
FIG. 5 depicts an illustrative flow chart of an exemplary process for probing a route for latency in accordance with some embodiments of the disclosure.

FIG. 5 depicts an illustrative process 500 for probing a route for latency in accordance with some embodiments of the disclosure. In some embodiments, process 500 may be performed by at least one node of network 100 or network 300. For example, in an illustrate example, process 500 may be performed by control circuitries of nodes 310, 320, and 330. In some embodiments, process 500 may be performed as part of step 406.

Process 500 begins at 502, where at least one control circuitry (e.g., control circuitry 256) sends a probe packet from the first network node to the second network node via the particular probed route. The probe packet may have contents described above with respect to FIGS. 3A and 3B.

Process 500 continues at 504, where at least one control circuitry may append a timestamp to the probe packet at each hop along the route. For example, whenever a network node receives the probe packet, the control circuitry of that network node may append a timestamp indicative of the current time to the probe packet. In some embodiments, that control circuitry may also add its own identifier to the packet.

Process 500 continues at 506, where at least one control circuitry (e.g., control circuitry 256) may determine a gain value for a particular probed route based on a calculated latency value. In some embodiments, the latency value may be calculated by at least one control circuitry (e.g., control circuitry 256) based on each appended timestamp. For example, when the probe packet returns to the originating node, at least one control circuitry may sum the time periods that elapsed between time stamps. In some embodiments, the at least one control circuitry may then calculate a reciprocal of the latency value to acquire a gain value.

Figure 6:
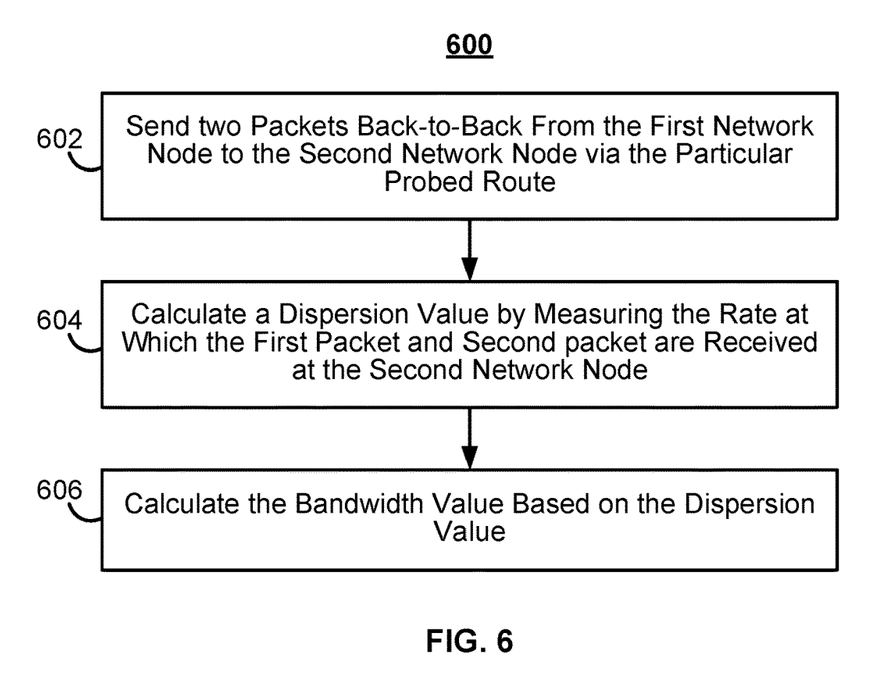
FIG. 6 depicts an illustrative flow chart of an exemplary process for probing a route for bandwidth in accordance with some embodiments of the disclosure.

FIG. 6 depicts an illustrative process 600 for probing a route for bandwidth in accordance with some embodiments of the disclosure. In some embodiments, process 600 may be performed by at least one node of network 100 or network 300. For example, in an illustrate example, process 600 may be performed by control circuitries of nodes 310, 320, and 330. In some embodiments, process 600 may be performed as part of step 406.

Process 600 begins at 602, where at least one control circuitry (e.g., control circuitry 256) sends two packets back-to-back from the first network node to the second network node via the particular probed route. For example, the packets may be sent in accordance with TOPP topology described above with respect to FIGS. 3A and 3B.

Process 600 continues at 604, where at least one control circuitry (e.g., control circuitry 256) may calculate a dispersion value by measuring the rate at which the first packet and second packet are received at the second network node. For example, at least one control circuitry may generate a timestamp each time a packet is received and calculate the rate based on the timestamps.

Process 600 continues at 606, where at least one control circuitry (e.g., control circuitry 256) may calculate the bandwidth value based on the dispersion value. For example, the bandwidth value may be calculated based on the time difference between the receipt of the two packets in accordance with TOPP algorithm described above with respect to FIGS. 3A and 3B.

Figure 7:
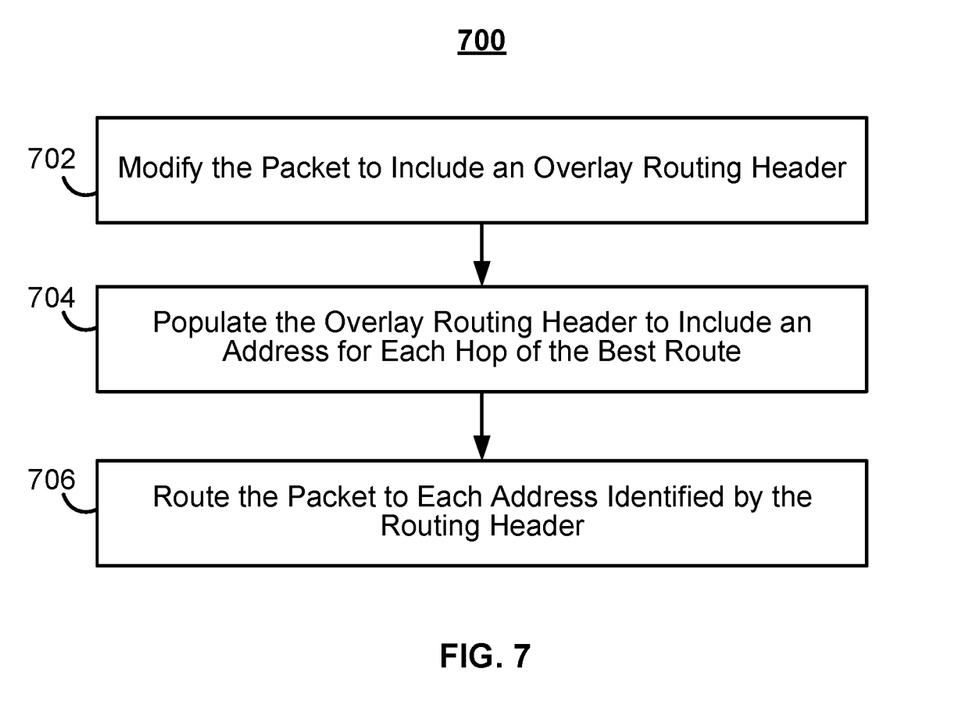
FIG. 7 depicts another illustrative flow chart of an exemplary process for routing a packet along an optimal route, in accordance with some embodiments of the disclosure.

FIG. 7 depicts another illustrative process 700 for routing a packet along an optimal route, in accordance with some embodiments of the disclosure. In some embodiments, process 700 may be performed by at least one node of network 100 or network 300. For example, in an illustrate example, process 700 may be performed by control circuitries of nodes 310, 320, and 330. In some embodiments, process 700 may be performed as part of step 414 to route the packet along the preferred route from a first network node to a second network node.

Process 700 begins at 702, where at least one control circuitry (e.g., control circuitry 256) modifies the packet to include an overlay routing header. In some embodiments, the overlay routing header may have data described above with respect to FIGS. 3A and 3B. In some embodiments, the overlay routing header may specify an order of network nodes to which the packet should be routed at each hop.

Process 700 continues at 702, where at least one control circuitry (e.g., control circuitry 256) populates the overlay routing header to include an address for each hop of the preferred route. For example, the populated overlay routing header may specify the first hop by listing the address of network node 330, and specify the second hop by listing the address of network node 320. In this example, the packet is to be routed from network node 310 to network node 330 as the first hop, and to network node 320 as a second hop.

Process 700 continues at 704, where several control circuitries of several network nodes (e.g., network nodes 310, 320, 330) route the packet to each address identified by the overlay routing header. For example, control circuitry of network node 310 may route the packet to network node 330 as indicated by the first hop specified by the overlay routing header. Then, control circuitry of network node 330 may route the packet to network node 320 as indicated by the second hop specified by the overlay routing header.

The above-described embodiments of the present disclosure are presented for the purposes of illustration and not of limitation. Furthermore, the present disclosure is not limited to a particular implementation. For example, one or more steps of the methods described above may be performed in a different order (or concurrently) and still achieve desirable results. In addition, the disclosure may be implemented in hardware, such as on an application-specific integrated circuit (ASIC) or on a field-programmable gate array (FPGA). The disclosure may also be implemented in software by, for example, encoding transitory or non-transitory instructions for performing the process discussed above in one or more transitory or non-transitory computer-readable media.

While some portions of this disclosure may make reference to "convention," or "related art," any such reference is merely for the purpose of providing context to the invention(s) of the instant disclosure, and does not form any admission, express or implied, as to what constitutes the state of the prior art. As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

What is claimed is:

1. A method for identifying a preferred route for a packet from a first network node to a second network node, the method comprising:
   (a) maintaining, by control circuitry, a set of possible routes from the first network node to the second network node, wherein each possible route has an associated weight value;
   (b) randomly selecting by the control circuitry, a subset of routes from the set of possible routes based on the respective associated weight value of each possible route;
   (c) determining, by the control circuitry, a gain value for each route of the subset of routes, wherein the determining comprises:
   sending a probe packet from the first network node to the second network node via the respective route;
   calculating a latency value based on a set of timestamps in the probe packet, wherein each timestamp in the set of timestamps corresponds to an arrival time of the probe packet at a respective hop along the respective route; and
   determining the gain value for the respective route based on the calculated latency value;
   (d) designating, by the control circuitry, a route of the subset of routes as a preferred route based on comparing the determined gain values;
   (e) updating, by the control circuitry, each weight value associated with each respective probed route based on the respective determined gain value;
   (f) periodically repeating operations (b)-(e) by the control circuitry;
   (g) receiving, by the control circuitry, a request, at the first network node, at a given time, to route the packet to the second network node; and
   (h) in response to receiving the request, routing, by the control circuitry, the packet along the route designated, at the given time, as the preferred route.

2. The method of claim 1, further comprising:
   including a last used route from the first network node to the second network node into the subset of routes; and
   including an Internet Protocol (IP) route from the first network node to the second network node into the subset of routes.

3. The method of claim 1, further comprising:
   probing, by the control circuitry, each route from the subset of routes to determine a bandwidth value for each probed route; and
   designating, by the control circuitry, a route of the subset of routes that has a highest bandwidth value as the preferred route.

4. The method of claim 3, wherein determining the bandwidth value for each probed route comprises:

sending, by the control circuitry, two packets back-to-back from the first network node to the second network node via the particular probed route;

calculating, by the control circuitry a dispersion value by measuring a rate at which a first packet and a second packet of the two packets are received at the second network node; and calculating, by the control circuitry, the bandwidth value based on the dispersion value.

5. The method of claim 1, wherein routing the packet along the preferred route designated at the given time, as the preferred route, comprises:

modifying, by the control circuitry, the packet to include an overlay routing header; and routing, by the control circuitry, the packed based on data of the overlay routing header.

6. The method of claim 5, further comprising:

populating, by the control circuitry, the overlay routing header to include an address for each hop of the preferred route; and routing, by the control circuitry, the packet to each address identified by the overlay routing header.

7. The method of claim 1, further comprising:

initializing, by the control circuitry, each associated weight value for each possible route based on a length of the respective route; and normalizing, by the control circuitry, the associated weight values.

8. The method of claim 1, wherein updating each weight value associated with a particular probed route comprises:

calculating, by the control circuitry, a ratio value by dividing the determined gain of the particular probed route by the weight value associated with the particular probed route;

calculating, by the control circuitry, a natural exponent of the ratio value; and multiplying, by the control circuitry, the natural exponent by the current weight value to calculate an updated weight value.

9. The method of claim 1, wherein the first network node and the second network node are nodes of a software defined wide area network.

10. A system for identifying a preferred route for a packet from a first network node to a second network node, the system comprising:

storage circuitry for storing instructions for operating the system; and communication circuitry configured to transmit and receive packets;

control circuitry configured to:
 (a) maintain a set of possible routes from the first network node to the second network node, wherein each possible route has an associated weight value;
 (b) randomly select a subset of routes from the set of possible routes based on the respective associated weight value of each possible route;
 (c) determine a gain value for each route of the subset of routes, wherein to determine the gain value, the control circuitry is configured to:
  send a probe packet from the first network node to the second network node via the respective route;
  calculate a latency value based on a set of timestamps in the probe packet, wherein each timestamp in the set of timestamps corresponds to an arrival time of the probe packet at a respective hop along the respective route; and
  determine the gain value for the respective route based on the calculated latency value;
 (d) designate a route of the subset of routes as a preferred route based on comparing the determined gain values; and
 (e) update each weight value associated with each respective probed route based on the respective determined gain value.

11. The system of claim 10, wherein the control circuitry is further configured to:

include a last used route from the first network node to the second network node into the subset of routes; and include an Internet Protocol (IP) route from the first network node to the second network node into the subset of routes.

12. The system of claim 10, wherein the control circuitry is further configured to:

probe each route from the subset of routes to determine a bandwidth value for each probed route; and designate a route of the subset of routes that has a highest bandwidth value as the preferred route.

13. The system of claim 12, wherein to determine the bandwidth value for each probed route, the control circuitry is further configured to:

send two packets back-to-back from the first network node to the second network node via the particular probed route;

calculate a dispersion value by measuring the rate at which a first packet and a second packet of the two packets are received at the second network node; and calculate the bandwidth value based on the dispersion value.

14. The system of claim 10, wherein to route the packet along the preferred route designated, at the given time, as the preferred route, the control circuitry is further configured to:

modify the packet to include an overlay routing header; and route the packed based on data of the overlay routing header.

15. The system of claim 14, wherein the control circuitry is further configured to:

populate the overlay routing header to include an address for each hop of the preferred route; and route the packet to each address identified by the overlay routing header.

16. The system of claim 10, wherein the control circuitry is further configured to:

initialize each associated weight value for each possible route based on a length of the respective route; and normalize the associated weight values.

17. The system of claim 10, wherein to update each weight value associated with each perspective probed route, the control circuitry is further configured to:

calculate a ratio value by dividing the determined gain of the particular probed route by the weight value associated with the particular probed route;

calculate a natural exponent of the ratio value; and multiply the natural exponent by the current weight value to calculate an updated weight value.

18. The system of claim 10, wherein the first network node and the second network node are nodes of a software defined wide area network.

19. The system of claim 10, wherein the control circuitry is further configured to:

(f) receive a request, at the first network node, at a given time, to route the packet to the second network node; and (g) in response to receiving the request, route, using the communication circuitry, the packet along the route designated, at the given time, as the preferred route.

\* \* \* \* \*